Feb. 16, 1954 W. C. ROGERS 2,669,470
ROTOR ASSEMBLY APPARATUS
Filed Dec. 18, 1950

INVENTOR
WAYNE C. ROGERS

BY
ATTORNEY

Patented Feb. 16, 1954

2,669,470

UNITED STATES PATENT OFFICE 2,669,470

ROTOR ASSEMBLY APPARATUS

Wayne C. Rogers, Worcester, Mass., assignor to Riley Stoker Corporation, Worcester, Mass., a corporation of Massachusetts Application December 18, 1950, Serial No. 201,305

4 Claims. (Cl. 287—52)

This invention relates to a rotor assembly for a pulverizer or the like, and more particularly to the construction and arrangement of a rotatable shaft and various parts mounted on the shaft to rotate therewith.

Many pulverizers of various types include a shaft rotatably supported in suitable bearings and carrying one or more disks or wheels having central hubs mounted on the shaft and usually keyed thereto. The hub or hubs are frequently located on a cylindrical portion of the shaft and urged axially against a shoulder on the shaft by means of a screw threaded nut or the like. It is often found that when such machines are placed in service a pronounced pounding or vibration will arise.

I have discovered that such difficulties are the result of differences in the heat expansion of the various parts of the rotor assembly. Pulverizers are often supplied with hot air to aid in evaporating moisture from the material being pulverized and thereby make it possible to operate the machines at reasonable capacity with wet materials. Such hot air of course raises the temperature of the machines and causes the various parts thereof to expand. The shafts are usually made of carbon steel, whereas the rotor hubs are usually made of cast iron, which has an appreciably smaller coefficient of heat expansion than carbon steel. Consequently as a machine becomes hot the shaft will expand longitudinally to a greater extent than the hubs, the nut will no longer hold the hubs tightly against the shoulder, and vibration will occur.

It is accordingly one object of the invention to overcome these difficulties and to provide a simple rotor assembly for a pulverizer or the like which will remain tight and free from vibration.

It is a further object of the invention to provide a rotor assembly for a pulverizer or the like which can be subjected to considerable change in temperature without loosening of the various parts.

With these and other objects in view, as will be apparent to those skilled in the art, the invention resides in the combination of parts set forth in the specification and covered by the claims appended hereto.

In accordance with the invention in its preferred form, a pulverizer or the like is provided with a rotatable shaft having thereon a shoulder and a clamping device spaced axially from the shoulder. Mounted on the shaft between the shoulder and the device is a group of elements including one or more hubs and a sleeve and this group of elements is forced axially against the shoulder by means of the clamping device. The hub or hubs are made of a material having a different coefficient of heat expansion from the shaft, and the sleeve is made of a material having a still different coefficient of heat expansion, the shaft coefficient being intermediate the coefficient of the hubs and the coefficient of the sleeve. Thus if the hubs have a smaller coefficient than the shaft, as in the case of cast iron hubs and a carbon steel shaft, the sleeve will be made of a material having a greater coefficient than the shaft. Thus the greater expansion of the sleeve will counteract the smaller expansion of the hubs. By providing a sleeve of a suitable material, with due regard to the dimensions of the other parts and their coefficients of heat expansion, the axial expansion of the group of elements may be made substantially the same as that of the shaft, so that the assembly will remain tight regardless of a considerable change in temperature.

Referring to the drawings illustrating one embodiment of the invention, and in which like reference numerals indicate like parts, Fig. 1 is a vertical longitudinal section through a pulverizer;

Figure 1:
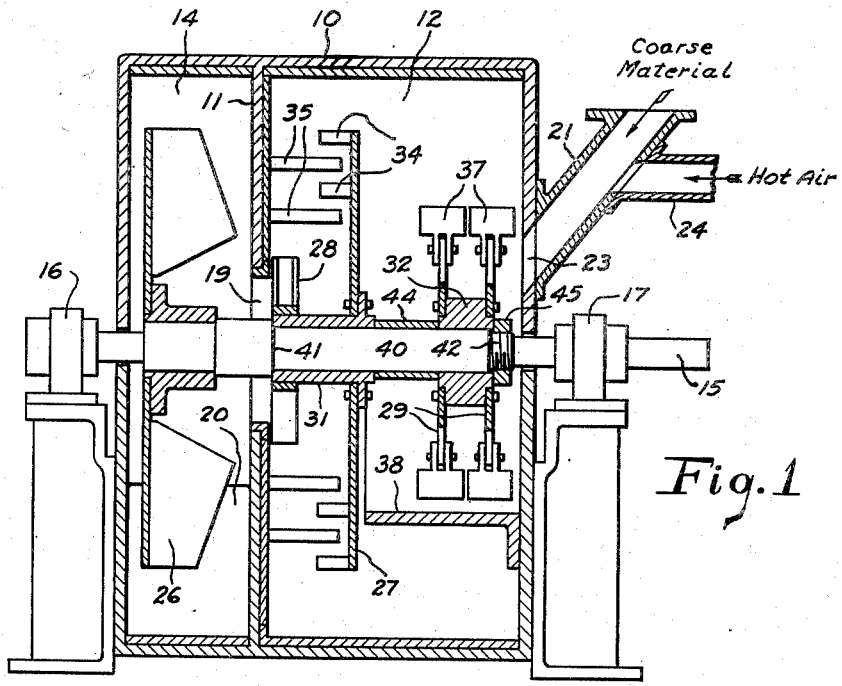

In the drawings there is shown a pulverizer of the general type disclosed in the patent to Riley et al. No. 1,759,134 granted May 20, 1930. The machine illustrated comprises a casing 10 which is divided internally by an upright wall 11 into a pulverizing chamber 12 and a fan chamber 14. A horizontal shaft 15 extends through the casing and is rotatably supported in suitable bearings 16 and 17. The wall 11 has a central opening 19 therethrough coaxial with the shaft, and the fan chamber 14 has a tangentially positioned outlet 20. An inlet chute 21 for coarse material leads to an inlet opening 23 in the pulverizing chamber wall remote from the fan chamber, and a duct 24 conveys hot air to this chute. The shaft 15 carries a fan 26 in the fan chamber 14 and an upright disk 27 in the pulverizing chamber 12. The shaft also carries rejector blades 28 which revolve adjacent the opening 19, and two upright disks 29 which are located between the disk 27 and the inlet openings 23. The disk 27 and the rejector blades 28 are secured to a hub 31, and the two disks 29 are secured to a hub 32, both these hubs being keyed to the shaft. The disk 27 carries revoluble pegs 34 which interfit with stationary pegs 35 mounted on the wall 11. The disks 29 carry hammers 37 which revolve above a stationary shelf 38 mounted in the lower portion of the casing.

Figure 2:
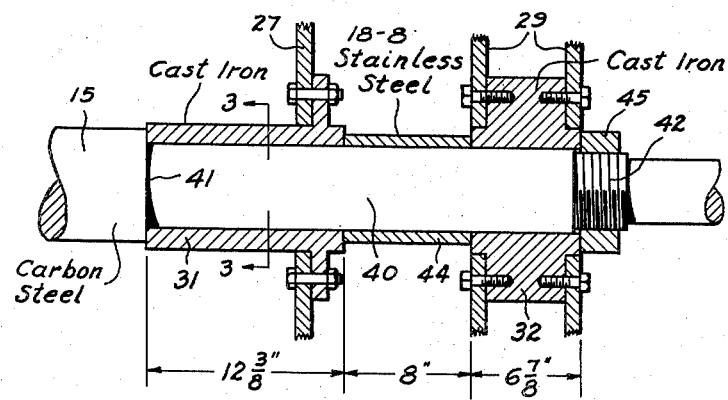
Fig. 2 is an enlarged view of a portion of Fig. 1.
Figure 3:
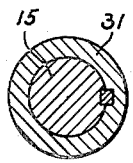
Fig. 3 is a section taken on the line 3—3 of Fig. 2.

Referring now particularly to Fig. 2, it will be seen that the shaft 15 is shaped to provide an elongated cylindrical portion 40 terminating at one end in a shoulder 41 and at the other end in a screw-threaded portion 42. The two hubs 31 and 32, together with a separating sleeve 44 between them, are mounted on the cylindrical portion 40, with the hub 31 engaging the shoulder 41. A nut 45 is mounted on the threaded portion 42 and engages the hub 32, so that the two hubs and the sleeve may be gripped tightly between the nut and the shoulder 41.

Since a considerable quantity of hot air is supplied to the machine with the coarse material, particularly when the material has a high moisture content, the various parts of the machine often reach a high temperature during the operation. As the shaft and the hubs mounted thereon become heated they will expand. This might not cause any difficulty if these parts were all made of the same material, but this is not the case. Thus the shaft 15 would ordinarily be made of steel, viz. a carbon steel, whereas the hubs 31 and 32 would ordinarily be made of cast iron. Since carbon steel expands at a higher rate than cast iron, the tendency will be for the hubs to become loose on the shaft when the parts are heated up in operation. This is highly undesirable, since it may result in serious vibration.

In order to avoid this difficulty, the sleeve 44 is made of a material having a greater coefficient of heat expansion than the carbon steel shaft 15, so that the greater expansion of the sleeve will counteract the lesser expansion of the hubs. Preferably the lengths of the various parts and their respective coefficients of heat expansion are so related that the assembly will remain tight regardless of changes in temperature. In the embodiment illustrated the hub 31 has a length of 12⅜ inches, the sleeve 44 has a length of 8 inches, and the hub 32 has a length of 6⅞ inches. Hence the length of the shaft 15 between the shoulder 41 and the nut 45 is 27¼ inches. In this assembly it is proposed to make the sleeve 44 of 18–8 stainless steel (18% chromium and 8% nickel), which has a coefficient of heat expansion per degree centigrade of approximately .0000164. The corresponding coefficients for carbon steel and cast iron are .000012 and .0000105 respectively.

If now the introduction of the hot air through the duct 24 results in a temperature rise of say 100 degrees C. in the internal parts of the machine, the increase in the length of the carbon steel shaft 15 between the shoulder 41 and the nut 45 will be $27.25 \times 100 \times .000012 = .0327$ inch. The total increase in the lengths of the hubs 31—32 and the sleeve 44 will be $(19.25 \times 100 \times .0000105) +$
$(8 \times 100 \times .0000164) = .0333$ inch Since $.0333 - .0327 = .0006$, it will be noted that the assembly will actually be slightly tighter when heated to its normal operating temperature than when cold and idle, the slight difference in expansion of course being taken up elastically. There will be no difficulty with vibration resulting from the loosening of the hubs 31 and 32, so long as the length of the group of clamped elements (the hubs 31—32 and the sleeve 44) changes with changes in temperature at substantially the same rate as the length of the shaft between the shoulder 41 and the nut 45, as occurs in the example given.

Having thus described my invention, what I claim as new and desire to secure by Letters Patent is:

1. A rotor assembly for a pulverizer or the like adapted to operate at elevated temperatures comprising a rotatable shaft having a shoulder, a clamping device mounted on the shaft and spaced axially from the shoulder, and a group of elements mounted on the shaft between the shoulder and the device and urged axially against the shoulder by the device, the group including a rotor hub and a sleeve made of different materials having different coefficients of heat expansion, and the shaft being made of a material having a coefficient of heat expansion intermediate those of the hub and the sleeve, the dimensions and materials for the shaft, sleeve and hubs being such that the rate of increase with temperature of the length of the shaft between the shoulder and the clamping device is substantially the same as the rate of increase in length of the assembly of the said group of elements.

2. A rotor assembly for a pulverizer or the like adapted to operate at elevated temperatures comprising a rotatable carbon steel shaft having a shoulder, a clamping device mounted on the shaft and spaced axially from the shoulder, and a group of elements mounted on the shaft between the shoulder and the device and urged axially against the shoulder by the device, the group including a cast iron rotor hub and a stainless steel sleeve the dimension and materials of the said elements being such that the increase in length of the group at an elevated temperature is substantially the same as the increase in length of the shaft between the shoulder and clamping element.

3. A rotor assembly for a pulverizer or the like adapted to operate at elevated temperatures comprising a rotatable shaft having a shoulder, a clamping device mounted on the shaft and spaced axially from the shoulder, and a group of elements mounted on the shaft between the shoulder and the device and urged axially against the shoulder by the device, the group including at least two parts made of different materials having different coefficients of heat expansion, the shaft having a coefficient of heat expansion intermediate those of the said two parts, and the lengths of the elements and their respective coefficients of heat expansion being such that the elements will expand longitudinally the same amount as the shaft between the shoulder and the clamping device throughout a considerable change in temperature and will remain tightly gripped therebetween.

4. A rotor assembly for a pulverizer or the like adapted to operate at elevated temperatures comprising a rotatable shaft formed of medium carbon steel having a shoulder, a clamping device mounted on the shaft and spaced axially from the shoulder, and a group of elements mounted on the shaft between the shoulder and the device and urged axially against the shoulder by the device, the group including rotor hub means formed of cast iron having a coefficient of heat expansion less than that of the shaft and a sleeve of a material having a coefficient of heat expansion greater than that of the shaft, the lengths of the elements and their respective coefficients of heat expansion being such that as the temperature of the assembly increases the length of the group will increase at substantially the same rate as the length of the shaft between the shoulder and the clamping device.

WAYNE C. ROGERS.

References Cited in the file of this patent

UNITED STATES PATENTS

| Number | Name | Date |
|---|---|---|
| 1,513,279 | Sanford | Oct. 28, 1924 |
| 1,550,834 | Miller | Aug. 25, 1925 |
| 2,442,254 | Whitfield | May 25, 1948 |